United States Patent [19]

Stewart, Jr. et al.

[11] Patent Number: 4,761,207
[45] Date of Patent: Aug. 2, 1988

[54] CONTINUOUS SALT-BASED MELTING PROCESS

[75] Inventors: Donald L. Stewart, Jr., Hempfield Township, Westmoreland County; Jan H. L. VanLinden, Hampton Township, Allegheny County, both of Pa.

[73] Assignee: Aluminum Company of America, Pittsburgh, Pa.

[21] Appl. No.: 40,132

[22] Filed: Apr. 20, 1987

[51] Int. Cl.$^4$ ................................................. C25C 3/06
[52] U.S. Cl. ..................................... 204/67; 204/68; 75/68 R
[58] Field of Search .................. 204/67, 68; 75/68 R, 75/63

[56] References Cited

U.S. PATENT DOCUMENTS

| | | | |
|---|---|---|---|
| 3,846,123 | 11/1974 | Racunas et al. | 75/68 R |
| 3,904,494 | 9/1975 | Jacobs et al. | 204/67 |
| 3,955,970 | 5/1976 | Claxton et al. | 75/68 R |
| 3,984,234 | 10/1976 | Claxton et al. | 75/68 R |
| 3,997,336 | 12/1976 | Van Linden et al. | 75/68 R |
| 4,030,914 | 6/1977 | Papafingos et al. | 75/68 R |
| 4,106,928 | 8/1978 | Harvey et al. | 75/68 R |
| 4,128,415 | 12/1978 | Van Linden et al. | 75/65 R |
| 4,191,559 | 3/1980 | Van Linden et al. | 75/68 R |
| 4,209,496 | 6/1980 | Carpenter et al. | 423/210 |
| 4,286,985 | 9/1981 | Van Linden et al. | 75/65 R |
| 4,351,057 | 9/1982 | Biolik et al. | 373/117 |
| 4,385,964 | 5/1983 | Johnson et al. | 203/50 |
| 4,390,364 | 6/1983 | Yu | 75/67 A |
| 4,411,747 | 10/1983 | Dawless et al. | 204/67 |
| 4,436,627 | 3/1984 | McMonigle | 210/695 |
| 4,440,610 | 4/1984 | Dawless et al. | 204/67 |
| 4,465,659 | 8/1984 | Cambridge et al. | 204/67 |
| 4,486,228 | 12/1984 | Ormesher | 75/65 R |
| 4,568,430 | 2/1986 | Vire | 204/67 |
| 4,576,690 | 3/1986 | Fields et al. | 204/67 |
| 4,607,825 | 8/1986 | Briolle et al. | 75/68 R |

FOREIGN PATENT DOCUMENTS 2821353 12/1978 Fed. Rep. of Germany .
2090153 7/1982 United Kingdom .

Primary Examiner—John F. Niebling
Assistant Examiner—Steven P. Marquis
Attorney, Agent, or Firm—Douglas G. Glantz

[57] ABSTRACT

A continuous salt-based process is provided for melting and reclaiming aluminum from aluminum scrap containing impurities including heating a molten salt in a heat bay, mixing the heated salt with aluminum scrap or skim in a charge bay to form a molten charge mixture, separating aluminum from impurities in the charge bay by coalescing aluminum to form a molten aluminum metal pad, chlorinating a portion of the charge mixture from the charge bay to form a chlorinated salt mixture and metal chlorides, removing metal chlorides from the salt mixture, and feeding the salt mixture back to the heat bay. In one aspect, the chlorinating step of the present invention includes introducing carbon monoxide or, preferably, solid carbon to control oxide concentration. The process further comprises adding fluorides and removing metal chlorides from the salt to maintain a preferred salt composition. The metal chlorides can be removed by withdrawing volatile metal chloride gases and electrolytically reducing metal chlorides in the molten salt.

16 Claims, 1 Drawing Sheet

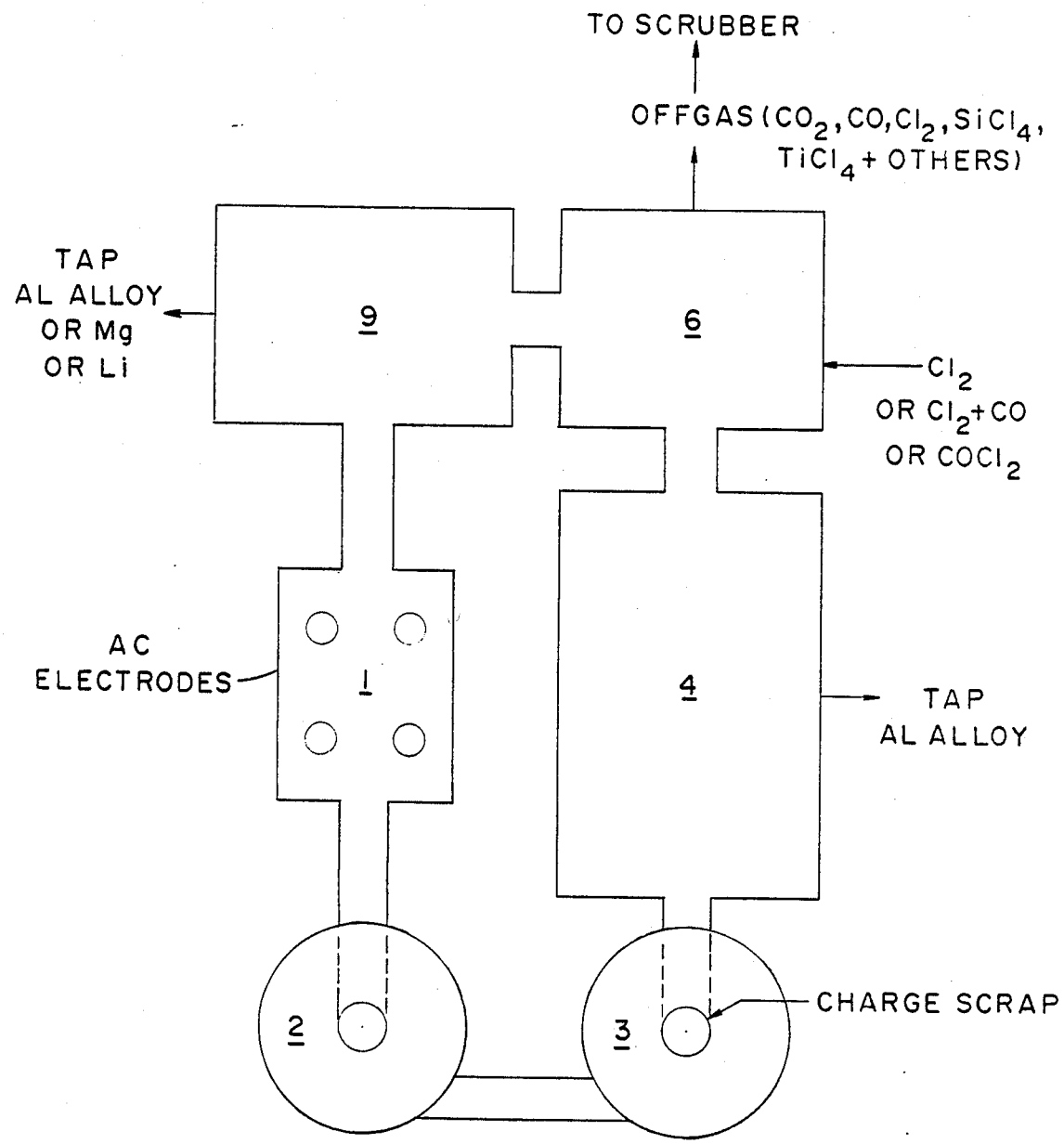

CONTINUOUS SALT-BASED MELTING PROCESS

BACKGROUND OF THE INVENTION

This invention relates to a recycling process for recovering or reclaiming aluminum metal from aluminum containing impurities such as from aluminum scrap or aluminum skim or dross.

Aluminum metal is an engineering material which can be readily recycled. Aluminum recycling involves the recovery or reclamation of aluminum metal from aluminum scrap containing impurities, e.g., such as aluminum scrap from used beverage cans or aluminum skim or dross from processes wherein molten aluminum metal comes into contact with oxygen in the air. Typically, the impurities in the aluminum scrap or skim exist as oxides and include aluminum oxide on the surface of the aluminum and other oxides such as surface magnesium oxide deriving from alloying elements. Aluminum skim often contains nitrides such as AlN and carbides such as AlC. Other extraneous materials commonly present in used beverage can scrap are silicon dioxide from dirt or titanium dioxide from pigment in the surface coatings on the used beverage cans.

Molten salt reclamation processes involve lifting non-metallic materials from aluminum or aluminum alloys during melting and preferentially wetting the non-metallic materials comprising the impurities in the incoming aluminum scrap. The molten salt preferentially wets the impurities which separate from the aluminum as the aluminum coalesces into metal droplets. The aluminum metal droplets sink to the bottom of a salt-containing process vessel and form into a continuous molten metal pad of aluminum.

The preferential wetting of the oxides and the resulting separation of aluminum from such contaminant oxides is a function of salt composition and the amount of solid particulate oxides and nitrides present in the salt. As scrap is fed to the salt-containing process vessel, the amount of oxides present in the salt increases with each increment of scrap added to the process. This increasing oxide content poses a serious problem in salt-based reclamation processes since the presence of oxides at levels higher than 5 to 30 wt %, as a function of particle size distribution, causes significant reductions in the recovery of aluminum from the process. In effect, the high oxide levels poison the process for reclaiming aluminum metal. This aspect of the conventional processes has been a significant drawback in the efficiency and economics of salt-based recovery systems.

It is an object of the present invention to provide a process for reclaiming aluminum metal from aluminum scrap or skim containing impurities.

It is a further object of the present invention to provide a process for reclaiming aluminum metal from aluminum scrap or skim containing impurities at a higher yield than in present processes.

It is yet another object of the present invention to provide a process for melting aluminum metal while preventing contamination of the melt to an extent that is not now practicable.

These and other objects of the present invention will become apparent from the description of the invention as follows.

SUMMARY OF THE INVENTION

The process of the present invention for continuous salt-based melting and purifying of aluminum includes heating a molten salt in a heat bay, mixing the heated salt with aluminum scrap or skim in a charge bay to form a molten charge mixture, separating aluminum metal from impurities by coalescing to form a molten metal pad of aluminum and a salt sludge containing separated impurities, chlorinating a portion of the salt sludge to form a chlorinated salt mixture containing metal chlorides, removing metal chlorides from the chlorinated salt mixture, and feeding the remaining salt mixture back to the heat bay. The process chlorinating step includes using carbon or carbon monoxide to control oxide concentration. In one aspect, carbon is the preferred agent to control oxide concentration. The step for removing metal chlorides includes withdrawing metal chloride gas and further includes reducing molten metal chlorides electrolytically and removing the reduced metal so produced.

BRIEF DESCRIPTION OF THE DRAWING

The sole FIGURE is a schematic diagram depicting the overall process of the present invention.

DETAILED DESCRIPTION

The process of the present invention represents a continuous deep salt metal reclamation technique designed and developed primarily for melting high surface area, dirty aluminum scrap. Used beverage cans are an example of such an aluminum scrap, and the process of the present invention is suitably tailored to the high volume of such used beverage cans being recycled today. However, the process of the present invention is not limited to used beverage cans and also can be applied to most any aluminum containing oxide impurities including aluminum skim or dross formed in melting processes wherein molten aluminum metal comes into contact with oxygen in the air.

The continuous metal scrap reclamation process of the present invention involves a molten salt maintained continuously in the molten state and providing a chemical composition and oxide composition such that metal recovery is achieved at improved levels continuously.

The process of the present invention operates to control and maintain the chemical and physical composition of the salt continuously at levels consistent with the maximum recovery of aluminum metal through reaction of the oxides with chlorine and carbon or carbon monoxide to form chlorides of two general types: volatile and non-volatile. The volatile chlorides, e.g., such as titanium tetrachloride and silicon tetrachloride, are removed from the continuous salt-based melting process as part of the reaction sequence in the carbon monoxide/dioxide vapor waste stream. Small amounts of all chlorides present, including aluminum chloride, are removed in the offgas stream, but most remains in the molten salt. Aluminum chloride ($AlCl_3$) in the pure state has a vapor pressure much higher than one atmosphere at aluminum melting temperature. However, $AlCl_3$ forms readily low vapor pressure complexes with most other metal chlorides, i.e., $NaCl.AlCl_3$.

Non-volatile chlorides, e.g., such as aluminum chloride and magnesium chloride, are removed in a process step by electrolysis. The process provides a continuous melting operation in which recovery of molten aluminum is maximized by controlling the integrity of the salt-based melting medium continuously.

Referring now to the FIGURE, a continuous scrap remelt process involves a superheated molten salt melt medium circulated throughout the continuous process of the present invention beginning, for purposes of illustration, in heat bay 1. Salt is heated in heat bay 1 to a temperature to maintain a molten charge in the heat bay, e.g., such as in the range of about 1400°-1450° F. The salt is pumped from heat bay 1 by pump 2 to charge bay 3 where the salt is mixed with aluminum scrap through an appropriate agitation in a swirl motion. In one aspect, scrap enters charge bay 3 continuously via a fume-controlling lock chamber (not shown). As the heated salt mixes with the aluminum scrap, coalesced molten metal collects in a lower portion of a collection bay depicted here as collection bay 4 where an optional coalescer is located to insure substantially metal-free salt/oxide passage to chlorination bay 6. Chlorine and carbon or carbon monoxide, alternatively phosgene, is introduced to the salt stream in chlorination bay 6 to convert the required amount of oxides into chlorides to maintain a steady-state oxide concentration. In the chlorination bay 6, several gas species are provided such that carbon dioxide is the main reaction by-product as well as titanium tetrachloride and silicon tetrachloride if titanium dioxide or silicon dioxide is present as scrap contaminant which, together with excess chlorine and carbon monoxide, are withdrawn from chlorination bay 6 and passed through a scrubber (not shown). $TiCl_4$/$SiCl_4$ may be recovered before scrubbing by condensation to yield by-product. The molten salt, now enriched with aluminum chloride and magnesium chloride, passes through to electrolysis bay 9 in which the required amount of reduction of aluminum chloride and magnesium choride is controlled to maintain a preferred steady-state salt concentration condition. A relatively small amount of aluminum and magnesium metal formed in this step can be tapped periodically or the bay can be connected to a coalescer so reduced metal joins the main pad of molten Al alloy. Cleaned salt passes from electrolysis bay 9 and is fed back into heat bay 1 to be superheated again and maintained at process temperatures of about 1400°-1450° F. The chlorination and electrolysis of chlorides can be replaced by direct reduction of oxides.

The means for heating the salt melt medium in heat bay 1 preferably is AC resistance heating. Heating provided by AC resistance minimizes fume generation and can be carried out under an inert atmosphere.

The process of the present invention takes place within two or more interconnected chambers, as depicted in the FIGURE. Molten salt flows continuously through the chambers, e.g., as shown in the FIGURE in counterclockwise flow. The flow of salt in the process is induced by a molten salt pump as depicted by pump 2 in the FIGURE. Multiple electrodes can be used in the heat bay to transfer electrical energy to the salt.

Salt leaving heat bay 1 enters charge bay 3, the next major chamber of the process. In the charge bay, as scrap is added continuously to a swirling or agitating salt, movement of the salt aids in the separation of oxides from the aluminum during melting. Flow rates of the salt into the charge bay 3 are controlled in the process of the present invention to be directly related to the scrap charge flow rate and incoming salt temperature. In this way, the process of the present invention provides a superheated salt (above about 1350° F.) for providing the heat necessary to melt the aluminum scrap.

The molten salt of the present invention comprises a salt containing about 75-98% chlorides of sodium, potassium, magnesium, aluminum, calcium, and lithium. Other chlorides such as barium chloride or others are either more expensive or more hazardous and are not preferred. The salt further contains up to 25%, preferably about 2-20%, and more preferably about 5-15% by weight fluorides of one or more of sodium, potassium, magnesium, calcium, aluminum, and lithium. The composition of the salt is selected to control performance of the process in the three process steps of charge mixing/coalescence, chlorination, and reduction at the lowest practical temperature. Salt melting temperature range in the process of the present invention preferably is low, e.g., lower than about 1350° F., but the process must be operated higher than the scrap melting point or salt melting point, whichever is higher. Fluoride presence in the salt is important for the reason that fluoride increases metal coalescence in the charge bay and further for the reason that kinetics of the chlorination reaction are enhanced. At higher fluoride concentrations, higher temperatures would be required. However, high fluoride concentration is preferred because the chlorination reaction rate is higher, thus decreasing the size of the chlorination unit. The increased reaction rate is believed to be attributable to an increased solubility of oxide. In one aspect, a salt containing about 40-50% NaCl, 40-50% KCl, and 5-15% $MgF_2$ or $CaF_2$ by weight is preferred. Outside this range of salt composition, coalescence and/or chlorination reaction rates decrease at the preferred operating temperature.

In charge bay 3, oxide films such as $Al_2O_3$ and MgO from the scrap and tramp oxides present in the scrap stream such as $TiO_2$ and $SiO_2$ are wetted by the salt preferentially to form a dilute salt sludge. The aluminum metal droplets sink to the bottom of charge bay 3 and coalesce into a continuous body or pad of molten metal, which is tapped from the chamber continuously or semi-continuously by a number of conventional tapping methods.

Salt flows from the charge bay into the chlorination chamber where sufficient oxides are reacted with chlorine and carbon or carbon monoxide to maintain the concentration of oxides at the desired level. The level of oxides should be maintained at less than about 10 wt %, preferably 5% or less by weight. All the oxides are chlorinated by a reaction of the type:

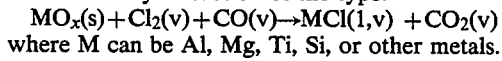
$MO_x(s) + Cl_2(v) + CO(v) \rightarrow MCl(l,v) + CO_2(v)$ where M can be Al, Mg, Ti, Si, or other metals.

It has been found that solid carbon used in place of carbon monoxide gas vapor in the process of the present invention and mixed with chlorine provides an unexpectedly advantageous result. In this aspect, excess carbon is added and remains continuously with the salt. It would have been expected that carbon monoxide would react at a higher reaction rate rather than solid carbon. However, it has been found empirically that carbon in the process of the present invention provides a reaction rate about two times faster than when carbon monoxide is substituted in the same process.

It has been found further that the chlorination step of the process of the present invention as depicted in the above equation will not go to any significant rate without the addition of carbon or carbon monoxide. For skim, AlN is formed as well as oxides.

Metal chlorides such as titanium tetrachloride and silicon tetrachloride leave the chlorination chamber in an offgas stream which also contains carbon dioxide, unreacted carbon monoxide, and chlorine gas. Other metal chlorides, such as magnesium chloride, have sufficiently low vapor pressures at temperatures of about 1400° F. and do not leave with waste gas but rather build up in the salt. Aluminum chloride builds up in the salt because it readily forms low vapor pressure complexes with most chlorides, e.g., such as $NaAlCl_4$ or $KAlCl_4$. Aluminum chloride would leave with the waste gases if the complexes were not formed since the atmospheric sublimation point of aluminum chloride is 365° F.

The final chamber through which the salt passes is called the reduction bay wherein the buildup of nonvolatile metal chlorides such as $MgCl_2$ and $AlCl_3$ is controlled. In the reduction bay, a low voltage DC current passes through the salt to form electrolytic products of chlorine gas and reduced metals. The chlorine gas so formed can be recycled to the chlorination reactor of the present process. The metals are formed at the bottom of the chamber, where the formed metal is the cathode, and can be removed periodically as molten aluminum or magnesium or alloys of both. Incoming scrap containing significant magnesium, e.g., about 2 wt %, sets up a magnesium reaction with the $AlCl_3$ in the charge bay, thereby forming aluminum and $MgCl_2$. In this case, the only metal recovered in the electrolytic cell to any extent is magnesium, since $AlCl_3$ in the continuous process of the present invention will not build up and $MgCl_2$ will increase in concentration in the salt at a higher rate, more so if electrolysis is not continuous. If the electrolysis/reduction is carried out continuously, an Al-Mg alloy is formed. However, a more pure Mg alloy (low Al) is formed as a by-product by allowing the $AlCl_3$ to react through many charge/chlorination cycles before operating a batch electrolysis reduction cell.

The preferred method for heating the molten salt-based melt medium of the process of the present invention is electrical resistance AC heating. However, electric radiation or other methods are suitable as substitutes.

The process of the present invention is controlled to minimize any contact with moist air. Otherwise, hydrolysis will occur, leading to chlorine losses. Additionally, fumes from the process would be environmentally undesirable. For these reasons, atmospheric contact is maintained at a minimum.

The process of the present invention provides a chlorination step and an electrolysis step operated continuously. However, such chlorination/electrolysis steps can be performed in a batch or semi-continuous reactor.

In one aspect, the chlorination step can be performed under a high pressure, e.g., above about 50-60 psig. Such a pressure increases reaction rates significantly. However, the process of the present invention is not limited to such higher pressures for practical reasons.

While the invention has been described in terms of preferred embodiments, the claims appended hereto are intended to encompass all embodiments which fall within the spirit of the invention.

What is claimed is:

1. A continuous process for melting and purifying aluminum beverage can scrap or skim containing impurities comprising:
   (a) heating a molten salt in a heat bay;
   (b) mixing the heated salt with an aluminum scrap or skim in a charge bay to form a molten charge mixture;
   (c) separating aluminum metal from impurities in said molten charge mixture by coalescing to form a molten aluminum metal pad and a salt sludge containing separated impurities;
   (d) chlorinating a portion of said salt sludge in a sufficient amount to control oxide concentration in the sludge to less than 10 wt % and to form a chlorinated salt mixture containing metal chlorides;
   (e) separating and removing metal chlorides from said chlorinated salt mixture; and
   (f) continuously feeding said salt mixture to said heat bay.

2. A process as set forth in claim 1 wherein said molten salt comprises about 75-98 wt % chlorides of Na, K, Mg, Al, Ca, or Li and about 2-25 wt % fluorides of Na, K, Mg, Ca, Al, or Li.

3. A process as set forth in claim 2 wherein said chlorinating forms volatile metal chlorides as gases and non-volatile metal chlorides as molten salts.

4. A process as set forth in claim 3 wherein said removing step further comprises reducing said non-volatile metal chlorides by an electrolytic reduction.

5. A process as set forth in claim 4 wherein said removing comprises scrubbing metal chloride gases to separate the metal chloride from carbonaceous vapor.

6. A process as set forth in claim 5 further comprising condensing silicon tetrachloride or titanium tetrachloride prior to said scrubbing.

7. A process as set forth in claim 6 wherein said heat bay employs AC resistance heating and said electrolytic reduction employs DC electrodes.

8. A process as set forth in claim 7 further comprising removing reduced metals formed by the electrolytic reduction of the non-volatile metal chlorides.

9. A process as set forth in claim 8 wherein said impurities comprise the oxides of aluminum, magnesium, silicon, or titanium and controlling said oxide concentration to less than about 5 wt %.

10. A process for melting and recovering aluminum from aluminum beverage can scrap comprising:
   (a) heating a molten salt containing more than about 75 wt % chloride salts and up to about 25 wt % fluoride salts in a heat bay;
   (b) mixing said heated salt with aluminum scrap in a charge bay to form a molten charge mixture;
   (c) separating said aluminum from impurities in the molten charge mixture by coalescing aluminum metal and forming a molten aluminum metal pad;
   (d) chlorinating a portion of said charge mixture from said charge bay by introducing chlorine gas and solid carbon to form a chlorinated salt mixture and metal chlorides from the impurities in said scrap in sufficient amount to control oxide concentration in the charge;
   (e) removing metal chlorides to maintain a specified concentration of metal chlorides in said salt mixture; and
   (f) recycling said salt mixture back to said heat bay.

11. A process as set forth in claim 10 wherein said specified concentration of fluorides is about 2 to about 20 wt %.

12. A process as set forth in claim 11 wherein said specified concentration of fluorides is about 5 to about 15 wt %.

13. A process as set forth in claim 12 wherein said removing comprises reducing metal chlorides electrolytically and removing the reduced metals so produced.

14. A continuous process for melting and recovering aluminum from aluminum beverage can scrap or skim comprising:
   (a) heating a molten salt of chlorides and fluorides in a heat bay to a temperature in the range of about 1400°–1500° F.;
   (b) mixing the heated salt with aluminum skim or dross in a charge bay to form a charge mixture;
   (c) separating aluminum from impurities in said charge mixture by coalescing aluminum metal to form a molten aluminum metal pad;
   (d) chlorinating a portion of said charge mixture in a sufficient amount to control oxide concentration in the charge in the presence of solid carbon to form a chlorinated salt mixture and metal chlorides;
   (e) removing metal chlorides from said salt mixture to maintain a specified chloride concentration of about 75–98 wt %; and
   (f) continuously feeding said salt mixture back to said heat bay.

15. A process as set forth in claim 14 wherein said specified chloride concentration comprises 85–95 wt % on an oxide free basis.

16. A process as set forth in claim 15 wherein said salt comprises about 75–98 wt % NaCl, KCl, $MgCl_2$, $AlCl_3$, $CaCl_2$, or LiCl and about 2–20 wt % of NaF, KF, $MgF_2$, $CaF_2$, $AlF_3$, or LiF, and said removing step further comprises reducing metal chlorides in an electrolytic reduction to form reduced metals and removing reduced metals from the salt mixture prior to the step of feeding the salt mixture to the heat bay.

* * * * *